May 17, 1966  A. J. WARNER ET AL  3,252,065
SEALING MEANS FOR IMPREGNATED ELECTRIC CAPACITOR
Filed Sept. 10, 1962

INVENTORS.
ARTHUR J. WARNER
ALLEN C. BLUESTEIN
BY
Dean, Fairbank and Hirsch
ATTORNEYS United States Patent Office 3,252,065
Patented May 17, 1966

3,252,065
SEALING MEANS FOR IMPREGNATED
ELECTRIC CAPACITOR
Arthur J. Warner, Columbia, S.C., and Allen C. Bluestein, New Bedford, Mass., assignors to Aerovox Corporation, New Bedford, Mass., a corporation of Massachusetts
Filed Sept. 10, 1962, Ser. No. 222,349
2 Claims. (Cl. 317—258)

This invention relates to the art of electric capacitors, more particularly of the type having its interelectrode space substantially filled with a liquid dielectric.

As conducive to an understanding of the invention, it is noted that the electric capacitor industry has, for many years, attempted to develop liquid impregnated capacitors with limited or non-leaking characteristics.

Capacitors with such characteristics are especially needed in the fluorescent lighting industry where leakage from overhead units causes damage to the contents and to the occupants of the room in which the fluorescent lighting fixture is installed.

To attempt to provide such substantially leak-proof capacitors which serves as the ballast capacitors for the fluorescent lamps, various techniques have been tried such as the use of thermoplastic and thermosetting resinous impregnants; strong containers with special seals; and special fuses, both internal and external which would cut off the circuit before the temperature rose sufficiently to cause leakage.

Where thermoplastic impregnants are used, they require special impregnating techniques which are difficult to control and hence add to the cost of the capacitor. Furthermore, the changes in volume which take place when the thermoplastic solidifies, tend to introduce gaseous voids which severely limit the life of the capacitor in many applications.

Where attempts have been made to overcome these difficulties by impregnating with monomeric liquids and polymerizing in place, such procedure has also resulted in a mass which is filled with bubbles, cracks and voids. This is due in part, to a reduction in volume that accompanies polymerization, to the volatile nature of the monomer and to the evolution of the gaseous by-products of polymerization.

Similar problems result from the use of the thermosetting resins since large reductions in volume accompany the cross linking or thermosetting process.

The use of fuses to solve the problem, has limited value, since the fuses can only be actuated when the temperature has attained a relatively high value, whereas liquid impregnated capacitors have been known to leak at room temperature even when not energized.

It is accordingly among the objects of the invention to provide a liquid impregnated capacitor which may readily be fabricated and which is substantially incapable of leaking under normal storage or operating conditions.

According to the invention, the capacitor includes a capacitor element, liquid dielectric, and a polymeric material which is capable of absorbing the liquid dielectric to form a highly viscous material which is essentially non-flowing under the conditions under which the capacitor is designed to operate.

In the accompanying drawings in which are shown one or more of various possible embodiments of the several features of the invention:

Figure 1:
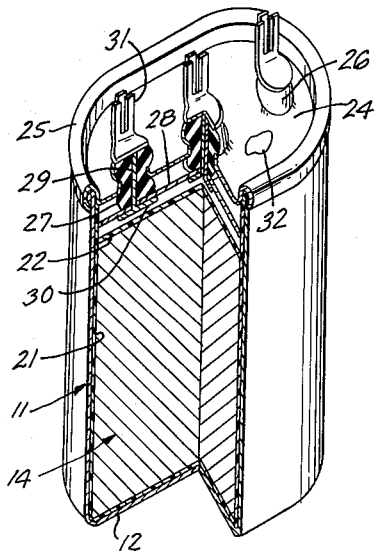
FIG. 1 is a perspective view with parts broken away and partly in section of a completed capacitor according to the invention.
Figure 2:
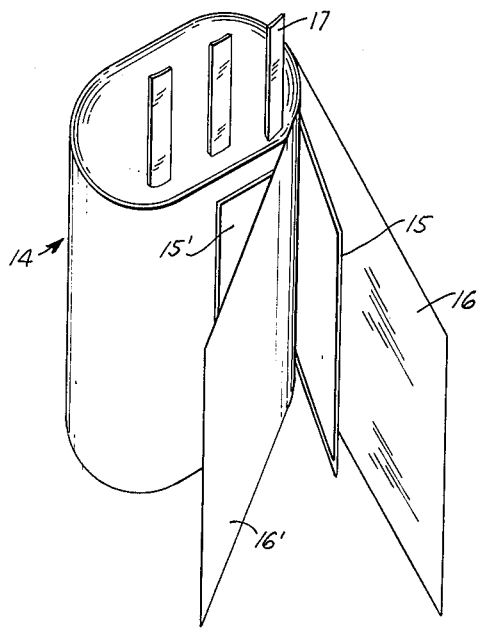
FIG. 2 is a perspective view of a capacitor section.
Figure 3:
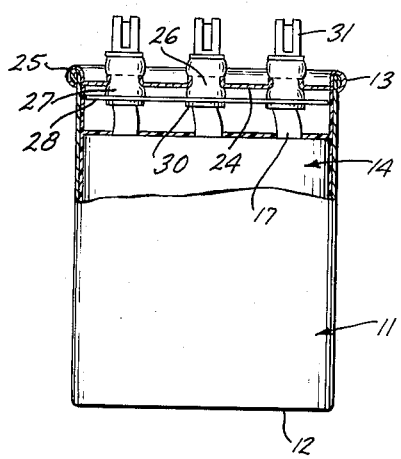
FIG. 3 is an elevational view of the capacitor with parts broken away.

Referring now to the drawings, as shown in FIGS. 1 and 3, the capacitor includes a casing or container 11, illustratively of steel, having a bottom wall or floor 12 and an open mouth 13. Positioned in the container 11 is a conventional capacitor element 14 which, as shown in FIG. 2, may be of conventional type comprising elongated strips of metal foil such as aluminum 15, 15' and intervening elongated strips of paper 16, 16' wound to form a coil in which the electrodes 15', 15 are separated substantially only by the paper strips 16, 16'. Electrical contact to the electrodes may be made as by means of metal tabs 17 or the like.

According to one embodiment of the invention, the metal can 11 is lined with a coating of elastomeric material 21, consisting of a copolymer of styrene and butadiene.

The ratio of styrene to butadiene is not critical although a relatively high butadiene content is preferred.

The particular polymer illustratively employed comprises a cold latex prepared by the rosin plus fatty acid emulsifying technique and preferably consisting of 24% bound styrene and 75% butadiene.

Positioned on the top surface of the capacitor section 14 are strips 22 of elastomeric material, preferably of the same composition as the elastomeric material 21 defining the lining of the container 11. The open mouth 13 of the can 11 is sealed by means of a closure plate 24, the periphery of which is crimped to the periphery of the mouth 13 as at 25 to form a dependable seal. The closure plate 24 illustratively has rising therefrom three insulated terminal posts 26, the bases 27 of which rest on a disc 28 of insulating material positioned in the container 11 and spaced from the upper end of the capacitor element as is clearly shown in FIG. 1. Extending through each of the posts 26 is a conducting member 29, the lower end of which is beneath the insulating disc 28 and is flattened as at 30 and the upper end of which extends from the upper end of each of the posts and carries a terminal tab 31, the terminals 17 of the capacitor being connected respectively to the flattened portions 30, as is clearly shown in FIG. 3.

The cover plate 24 has a filling aperture 32 and corresponding openings are provided in the insulated disc 28.

To complete the capacitor, the unit is, for example, according to one embodiment of the invention, treated in a vacuum at 125° C. and then impregnated with dielectric such as liquid pentachlorinated biphenyl, consisting of 54% chlorine and having a viscosity of 44–48 Saybolt Universal seconds at 210° F., in a manner which is well known to those skilled in the art.

After the impregnated units have been removed from the impregnating chamber, cleaned and the fill holes 32 closed as by soldering, the completed capacitors are then illustratively treated in an oven at say 100° C. for 48 hours.

With the construction and method above described, by reason of the interaction of the elastomeric material 21 and 22 with the dielectric material, a highly viscous mass is created so that even if there is a breach of the terminal seals or an opening of the casing closure, and even at relatively high temperatures, although the unit itself might fail, substantially no leakage will occur from the container.

If desired, to increase the amount of polymeric material, such as the elastomeric material above described, in the container, prior to inserting the capacitor element 14 therein, additional strips of polymeric material may be inserted into the bottom of the container to add to the amount of polymeric material resulting from the coating of the bottom wall or floor 12.

It is also within the scope of the invention to have a preformed liner of the desired polymeric material which is inserted into the container and/or a wrapper of such material may be wound around the capacitor section prior to insertion and additional strips of such material may also be provided in conjunction with such preformed liner or wrapper.

Although it is preferred for maximum security over a wide range of operating temperatures to use elastomeric material, where the capacitor is to be used, for example, at an operating temperature of say 75° C., the liner or coating and the strips employed, as above described, may comprise unmodified poly-styrene plastic which may be more readily handled and is usually less expensive.

It is of course to be understood that by adding the strips of the previously described styrene-butadiene copolymer in association with the polystyrene material, the range of operating temperatures may be increased.

Furthermore, it is within the scope of the invention to form the liner or coating with a mixture of polystyrene and styrene-butadiene copolymer instead of styrene-butadiene copolymer.

Among the polymers which have been used in addition to polystyrene and the copolymer of styrene and butadiene, are purified grades of natural rubber, synthetic polyisoprene, ethylene-propylene rubber, copolymers of isobutylene and isoprene, polyacrylonitrile, silicone, polyurethane, polybutadiene, polyacrylic.

Such polymers have been found to operate under varying temperature conditions and all have been found operative in association with the dielectric fluid employed, i.e. chlorinated biphenyl.

The capacitor above described thus is of great utility in many applications, and especially in the field of fluorescent lighting fixtures which are positioned adjacent to the ceiling of the room and by reason of the high viscosity developed in the interior of the unit, the latter will have substantially non-leaking characteristics as desired.

As many changes could be made in the above method and article, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. An electric capacitor comprising a casing, a capacitor element in said casing and a liquid impregnant and a polymeric material in the form of an elastomer in said casing combining to form an essentially non-flowing highly viscous mass, said polymeric material being selected from the group consisting of polystyrene, styrene-butadiene copolymer, natural rubber, synthetic polyisoprene, ethylene-propylene rubber, copolymers of isobutylene and isoprene, polyacrylonitrile, polyurethane, polybutadiene and polyacrylic polymers and said liquid impregnant is chlorinated biphenyl.

2. The combination set forth in claim 1 in which the container has a coating of a styrene-butadiene copolymer and the strips of such material are positioned on the top of the capacitor element, said container having a closure disc sealing the top thereof.

References Cited by the Examiner

UNITED STATES PATENTS

| 1,856,392 | 5/1932 | Kevelson | 174—52.6 |
| 1,931,455 | 10/1933 | Clark. | |
| 2,407,493 | 9/1946 | Hart. | |
| 2,525,473 | 10/1950 | Berberich et al. | 317—259 |
| 2,594,873 | 4/1959 | Clark | 317—259 |
| 2,963,771 | 12/1960 | Clemons | 29—25.42 |
| 3,084,415 | 4/1963 | Dokuchitz et al. | 29—25.42 |

ROBERT K. SCHAEFER, *Primary Examiner.*

JOHN F. WILDMAN, JOHN F. BURNS, *Examiners.*

W. F. ZAGURSKI, D. J. BADER, *Assistant Examiners.*